(12) United States Patent
Brunner et al.

(10) Patent No.: US 10,767,275 B2
(45) Date of Patent: Sep. 8, 2020

(54) AQUEOUS COPPER PLATING BATHS AND A METHOD FOR DEPOSITION OF COPPER OR COPPER ALLOY ONTO A SUBSTRATE

(71) Applicant: Atotech Deutschland GmbH, Berlin (DE)

(72) Inventors: Heiko Brunner, Berlin (DE); Lars Kohlmann, Berlin (DE); Agnieszka Witczak, Berlin (DE); Olivier Mann, Berlin (DE)

(73) Assignee: Atotech Deutschland GmbH, Berlin (DE)

( * ) Notice: Subject to any disclaimer, the term of this patent is extended or adjusted under 35 U.S.C. 154(b) by 282 days.

(21) Appl. No.: 15/748,332

(22) PCT Filed: Aug. 30, 2016

(86) PCT No.: PCT/EP2016/070365
§ 371 (c)(1),
(2) Date: Jan. 29, 2018

(87) PCT Pub. No.: WO2017/037040
PCT Pub. Date: Mar. 9, 2017

(65) Prior Publication Data
US 2018/0223442 A1    Aug. 9, 2018

(30) Foreign Application Priority Data
Aug. 31, 2015    (EP) .................................. 15183121

(51) Int. Cl.
*C25D 3/38*    (2006.01)
*C25D 7/12*    (2006.01)
*C08G 73/00*    (2006.01)

(52) U.S. Cl.
CPC .............. *C25D 3/38* (2013.01); *C25D 7/123* (2013.01); *C08G 73/00* (2013.01)

(58) Field of Classification Search
None
See application file for complete search history.

(56) References Cited

U.S. PATENT DOCUMENTS

| 4,157,388 A | 6/1979 | Christiansen |
| 5,976,341 A | 11/1999 | Schumacher et al. |

(Continued)

FOREIGN PATENT DOCUMENTS

| CN | 104630841 | * 5/2015 | ............... C25D 3/38 |

OTHER PUBLICATIONS

Official Action for Chinese Patent Application No. 201680048918.0 dated Jun. 4, 2019.

(Continued)

*Primary Examiner* — Stefanie S Wittenberg
(74) *Attorney, Agent, or Firm* — Renner, Otto, Boisselle & Sklar, LLP

(57) ABSTRACT

The present invention relates to bisurea derivatives and their use in aqueous plating baths for copper and copper alloy deposition in the manufacture of printed circuit boards, IC substrates, semiconducting and glass devices for electronic applications. The plating bath according to the present invention comprises at least one source of copper ions and a bisurea derivative. The plating bath is particularly useful for filling recessed structures with copper and build-up of pillar bump structures.

19 Claims, 1 Drawing Sheet

(56) References Cited

U.S. PATENT DOCUMENTS

| 6,099,711 A | 8/2000 | Dahms et al. |
| 2004/0187731 A1 | 9/2004 | Wang et al. |
| 2008/0210569 A1 | 9/2008 | Dahms et al. |
| 2009/0205969 A1 | 8/2009 | Jimenez et al. |
| 2011/0011746 A1 | 1/2011 | Brunner et al. |
| 2012/0160698 A1 | 6/2012 | Brunner et al. |
| 2014/0102910 A1 | 4/2014 | Rohde et al. |
| 2014/0178572 A1 | 6/2014 | Chow et al. |
| 2015/0284865 A1 | 10/2015 | Kienle et al. |
| 2015/0299883 A1 | 10/2015 | Brunner et al. |

OTHER PUBLICATIONS

PCT/EP20161070365; PCT International Search Report and Written Opinion of the International Searching Authority dated Oct. 27, 2016.

* cited by examiner

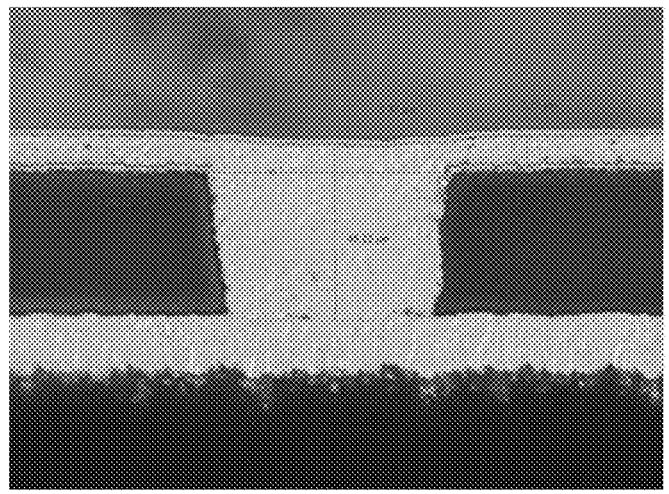

AQUEOUS COPPER PLATING BATHS AND A METHOD FOR DEPOSITION OF COPPER OR COPPER ALLOY ONTO A SUBSTRATE

The present application is a U.S. National Stage Application based on and claiming benefit and priority under 35 U.S.C. § 371 of International Application No. PCT/EP2016/070365, filed 30 Aug. 2016, which in turn claims benefit of and priority to European Application No. 15183121.1 filed 31 Aug. 2015, the entirety of both of which is hereby incorporated herein by reference.

FIELD OF THE INVENTION

The invention relates to bisurea derivatives and a method for their synthesis. The invention further relates to such polymers as additives in aqueous plating bath compositions, e.g. for electrolytic deposition of copper or copper alloys. The aqueous plating bath compositions are particularly suitable in the manufacture of printed circuit boards, IC substrates and the like as well as for metallisation of semiconducting and glass substrates.

BACKGROUND OF THE INVENTION

Aqueous acidic plating baths for electrolytic deposition of copper are used for manufacturing printed circuit boards and IC substrates where fine structures like trenches, through holes (TH), blind micro vias (BMV) and pillar bumps need to be filled or build up with copper. Another application of such electrolytic deposition of copper is filling of recessed structures such as through silicon vias (TSV) and dual damascene plating or forming redistribution layers (RDL) and pillar bumps in and on semiconducting substrates. Still another application which is becoming more demanding is filling through glass vias, i.e. holes and related recessed structures in glass substrates with copper or copper alloys by electroplating.

Conventionally, a combination of various additives is used in aqueous plating bath compositions. For example, electrolytic copper plating baths comprise a multitude of individual additives including levellers, carrier-suppressors and accelerator-brighteners. Similarly, zinc plating baths contain additives to improve inter alia the visual properties of zinc deposits.

The patent application EP 1 069 211 A2 discloses aqueous acidic copper electroplating baths comprising a source of copper ions, an acid, a carrier additive, a brightener additive and a leveller additive which can be poly[bis(2-chloroethyl) ether-alt-1,3-bis[3-(dimethylamino)propyl]urea (CAS-No. 68555-36-2) which contains an organo-bound halide atom (e.g., covalent C—Cl bonds) in at least one terminus.

US 2009/0205969 A1 describes cross-linked polymers made from urea, N,N-dialkylaminoalkylamine and N,N-bis-(aminoalkyl)-alkylamine as additive for electrolytic metal deposition. The process disclosed therein relates to electrolytic zinc deposition.

Similar urea-based polymers are also reported in U.S. Pat. No. 4,157,388 wherein all urea moieties are bridged via nitrogen containing alkylenes, i.e. secondary, tertiary amines and the like. Cationic derivatives and their use in electrolytic plating bath are disclosed in the German patent application DE 10 2005 060 030 A1. The individual urea moieties in these polymers are linked by quaternary ammonium derivatives.

Ureyl polymers are known in the art from EP 2 735 627 A1 as leveller for the electrolytic deposition of copper. Such polymers are can be obtained by a polyaddition of aminourea derivatives and nucleophiles. WO 2011/029781 teaches the same polymers for the electrolytic deposition of zinc. The latter document also teaches bisurea derivatives of a general formula without disclosing any specific examples. Moreover, the examples relating to said structures are diamides (examples 5 and 18 therein).

However, such additives when used in acidic copper plating baths are not suitable to fulfil the current and future requirements in manufacture of advanced printed circuit boards, IC substrates and metallisation of semiconducting and glass substrates. Depending on the circuitry layout, BMVs' in printed circuit boards and IC substrates need to be filled with copper not only conformally but completely. Typical requirements for BMV filling are for example: obtaining a completely filled BMV while depositing no more than 12 to 18 µm of copper onto the neighbouring planar substrate areas and at the same time creating a dimple on the outer surface of the filled BMV of no more than 5 µm.

In metallisation of semiconducting wafers, TSV filling must lead to a complete and void-free filling with copper while creating no more than ⅕ of via diameter of overplated copper onto the neighbouring planar areas. Similar requirements are demanded for filling through glass vias with copper.

OBJECTIVE OF THE INVENTION

Thus, it is an objective of the present invention to provide an aqueous copper plating bath for electrolytic deposition of copper or copper alloys, which fulfils the requirements for the above mentioned applications in the field of printed circuit board and IC substrate manufacturing as well as metallisation of semiconducting substrates like TSV filling, dual damascene plating, deposition of redistribution layers or pillar bumping and filling of through glass vias.

SUMMARY OF THE INVENTION

These objectives are solved by the aqueous copper plating bath for electrolytic copper or copper alloy deposition comprising at least one source of copper ions and at least one acid characterised in that it comprises at least one bisurea derivative comprising a bisurea building block according to formula (I)

wherein A represents a unit derived from a diurea compound of the following formula (A1)

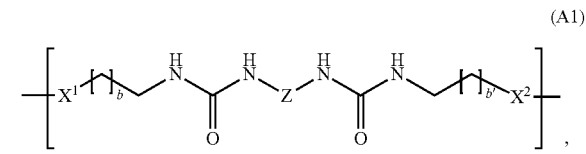

wherein $X^1$ and $X^2$ are divalent residues independently from each other selected from the following group consisting of

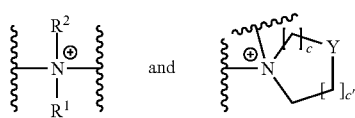 and wherein $R^1$ and $R^2$ are monovalent residues each selected independently from the group consisting of hydrogen, alkyl and polyoxyalkylene;
Y is selected from $CH_2$, O and S;
c is an integer ranging from 1 to 6; c' is an integer ranging from 1 to 6;
b is an integer ranging from 1 to 5;
b' is an integer ranging from 1 to 5;
Z is a divalent bridging moiety which is selected from the group consisting of alkylene, arylene and alkylene oxide compound whereby said alkylene oxide compound is represented by the following formula

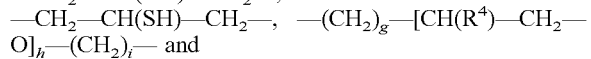

wherein d is an integer ranging from 0 to 3;
e is an integer ranging from 1 to 100; and
f is an integer ranging from 1 to 3;
f' is 0 or 1;
each $R^3$ is independently from each other selected from the group consisting of alkyl, aryl and hydrogen;
a is an integer and ranges from 1 to 100; and
D is a divalent residue and is selected from the group consisting of
—$CH_2$—CH(OH)—$CH_2$—,
—$CH_2$—CH(SH)—$CH_2$—, —$(CH_2)_g$—[CH($R^4$)—$CH_2$—O]$_h$—$(CH_2)_i$— and
—$CH_2$—CH(OH)—$(CH_2)_j$—[CH($R^5$)—$CH_2$—O]$_k$—$(CH_2)_l$—CH(OH)—$CH_2$—
wherein g is an integer ranging from 0 to 4;
h is an integer ranging from 1 to 100;
i is an integer ranging from 1 to 4;
each $R^4$ is independently from each other selected from the group consisting of alkyl, aryl and hydrogen;
j is an integer ranging from 1 to 4;
k is an integer ranging from 1 to 100;
l is an integer ranging from 1 to 4;
each $R^5$ is independently from each other selected from the group consisting of alkyl, aryl and hydrogen
and if a is 2 or greater each A and each D are selected independently from each other
and wherein the aqueous copper plating bath is free of (intentionally added) zinc ions.
These objectives also solved by the method for deposition of copper or copper alloy onto a substrate comprising the steps
(i) providing the substrate,
(ii) contacting the substrate with the aqueous copper plating bath described above, and
(iii) applying an electrical current between the substrate and at least one anode,
and thereby depositing copper or copper alloy on at least a portion of a surface of the substrate.
Recessed structures such as trenches, blind micro vias (BMVs'), through silicon vias (TSVs') and through glass vias can be filled with copper or copper alloy deposited from the aqueous copper plating bath according to the present invention. The copper or copper alloy filled recessed structures are void-free and have an acceptable dimple, i.e., a planar or an almost planar surface. Furthermore, the build-up of pillar bump structures is feasible.
The inventive aqueous copper plating bath allows for uniformal filling of recessed structures, in particular when recessed structures having different aspect ratios are filled in one step.

BRIEF DESCRIPTION OF THE FIGURES

FIG. 1 shows a BMV (blind micro via) filled with copper from an aqueous copper plating bath according to the invention.

DETAILED DESCRIPTION OF THE INVENTION

The aqueous copper plating bath for electrolytic copper or copper alloy deposition according to the invention comprises at least one source of copper ions, at least one acid and is characterised in that it comprises at least one bisurea derivative and wherein the aqueous copper plating bath is free of (intentionally added) zinc ions.
The bisurea derivative comprises a bisurea building block according to formula (I)

 (I)

wherein A represents a unit derived from a diurea compound of the following formula (A1)

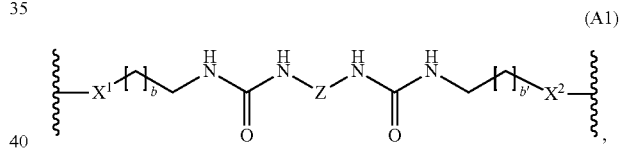 (A1)

wherein
$X^1$ and $X^2$ are divalent residues independently from each other selected from the following group consisting of

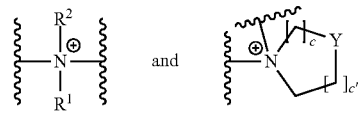 and wherein $R^1$ and $R^2$ are monovalent residues each selected independently from the group consisting of hydrogen, alkyl and polyoxyalkylene; Y is selected from $CH_2$, O, S; c is an integer ranging from 1 to 6, preferably from 1 to 3; c' is an integer ranging from 1 to 6, preferably from 1 to 3;
b is an integer ranging from 1 to 5, preferably from 1 to 2;
b' is an integer ranging from 1 to 5, preferably from 1 to 2;
Z is a divalent bridging moiety which is selected from the group consisting of alkylene (preferably said alkylene consists of 1 to 12 carbon atoms, more preferably of 2 to 8), arylene and alkylene oxide compound whereby said alkylene oxide compound is represented by the following formula

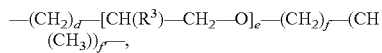

wherein d is an integer ranging from 0 to 3; e is an integer ranging from 1 to 100, e preferably ranges from 1 to 20; f is an integer ranging from 1 to 3; f' is 0 or 1; each $R^3$ is independently from each other selected from the group consisting of alkyl, aryl and hydrogen, preferably it is selected from $C_1$- to $C_6$-alkyl, phenyl and hydrogen, more preferably it is selected from hydrogen, methyl, ethyl, propyl, even more preferably it is selected from hydrogen and methyl;

a is an integer and ranges from 1 to 100, more preferably it ranges from 3 to 50, most preferably it ranges from 5 to 20; and D is a divalent residue and is selected from the group consisting of
—$CH_2$—CH(OH)—$CH_2$—,
—$CH_2$—CH(SH)—$CH_2$—,
—$(CH_2)_g$—[CH($R^4$)—$CH_2$—O]$_h$—$(CH_2)_i$— and
—$CH_2$—CH(OH)—$(CH_2)_j$—[CH($R^5$)—$CH_2$—O]$_k$—$(CH_2)_l$—CH(OH)—$CH_2$—, D preferably is selected from the group consisting of
—$CH_2$—CH(OH)—$CH_2$—,
—$(CH_2)_g$—[CH($R^4$)—$CH_2$—O]$_h$—$(CH_2)_i$— and
—$CH_2$—CH(OH)—$(CH_2)_j$—[CH($R^5$)—$CH_2$—O]$_k$—$(CH_2)_l$—CH(OH)—$CH_2$—;

wherein g is an integer ranging from 0 to 4; h is an integer ranging from 1 to 100, h preferably ranges from 1 to 20; i is an integer ranging from 1 to 4; each $R^4$ is independently from each other selected from the group consisting of alkyl, aryl and hydrogen, preferably it is selected from $C_1$- to $C_6$-alkyl, phenyl and hydrogen, it is more preferably selected from hydrogen, methyl, ethyl, propyl, even more preferably it is selected from hydrogen and methyl; j is an integer ranging from 1 to 4; k is an integer ranging from 1 to 100, k preferably ranges from 1 to 20; l is an integer ranging from 1 to 4; each $R^5$ is independently from each other selected from the group consisting of alkyl, aryl and hydrogen, preferably it is selected from $C_1$- to $C_6$-alkyl, phenyl and hydrogen, it is more preferably selected from hydrogen, methyl, ethyl, propyl, even more preferably it is selected from hydrogen and methyl and if a is 2 or greater each A and each D are selected independently from each other.

The individual units A in the bisurea building block according to formula (I) are selected to be the same or different. Also, the individual units D in the bisurea building block according to formula (I) are selected to be the same or different.

In a preferred embodiment of the present invention, $X^1$ and $X^2$ are the same as this facilitates the synthesis of the bisurea derivatives.

In a preferred embodiment of the present invention each Z is selected to be an alkylene oxide compound represented by the formula —$(CH_2)_d$—[CH($R^3$)—$CH_2$—O]$_e$—$(CH_2)_f$—(CH($CH_3$))$_{f'}$, more preferably, each d is 0, each e is an integer independently from each other ranging from 1 to 10 and each f' is 0.

In one preferred embodiment of the present invention, each f' is 1 and each f independently from each other ranges from 1 to 2.

In a preferred embodiment of the present invention, b and b' are the same and range from 1 to 2.

In another preferred embodiment of the present invention the alkylene, arylene or alkylene oxide compound forming Z are free of nitrogen atoms.

In a particularly preferred embodiment of the present invention each D is —$(CH_2)_g$—[CH($R^4$)—$CH_2$—O]$_h$—$(CH_2)_i$— and even more preferred each g is 0 and each i is an integer independently from each other ranging from 1 to 3.

The bisurea derivative preferably contains one or two terminating groups (TG) that are then bound to a unit derived from diurea compound A represented by formula (A1) and/or divalent residue D in the bisurea building block according to formula (I).

The bisurea derivatives containing said optional terminating groups is then represented by the following formulae (IIa) to (IIc)

The first terminating group (TG1) bound to a unit derived from diurea compound in the bisurea building block according to formula (I) is preferably selected from the group consisting of E-$G^1$-, $R^6$-$G^2$-,

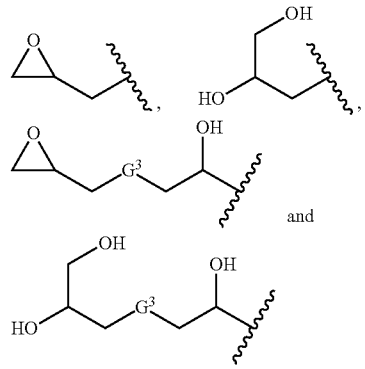

and

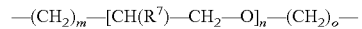

wherein $G^1$, $G^2$ and $G^3$ are divalent residues represented by the following formula —$(CH_2)_m$—[CH($R^7$)—$CH_2$—O]$_n$—$(CH_2)_o$— wherein m is an integer ranging from 0 to 3; n is an integer ranging from 1 to 100, n preferably ranges from 1 to 20; o is an integer ranging from 1 to 3; each $R^7$ is independently from each other selected from the group consisting of alkyl, aryl and hydrogen, preferably it is selected from $C_1$- to $C_6$-alkyl, phenyl and hydrogen, it is more preferably selected from hydrogen, methyl, ethyl, propyl, even more preferably it is selected from hydrogen and methyl;

E is a monovalent residue and selected from triflate, nonaflate, alkylsulphonates such as methanesulphonate, arylsulphonates such as tosylate, phenylsulphonate, p-nitrobenzosulphonate, p-bromobenzosulphonate and halogenides such as chloride, bromide and iodide; and $R^6$ is a monovalent residue selected from the group consisting of $C_1$- to $C_8$-alkyl, $C_1$- to $C_8$-alkenyl, aralkyl, aryl, preferably $R^6$ is selected from methyl, ethyl, propyl and allyl.

The second terminating group (TG2) bound to divalent residue D in the bisurea building block according to formula (I) is preferably selected from the group consisting of hydroxyl group (—OH), diurea compound A, monovalent residue E, $C_1$- to $C_8$-alkyl, aralkyl, aryl,

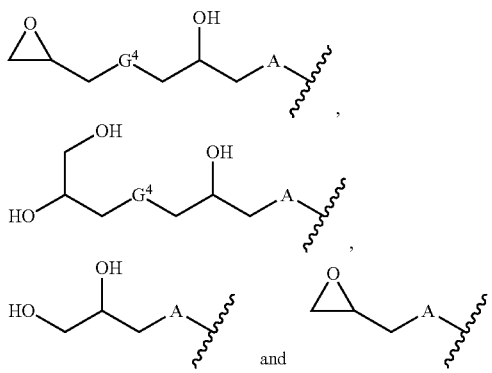

wherein $G^4$ is a divalent residue represented by the following formula —$(CH_2)_m$—$[CH(R^8)$—$CH_2$—$O]_n$—$(CH_2)_o$— wherein m is an integer ranging from 0 to 3; n is an integer ranging from 1 to 100, n preferably ranges from 1 to 20; o is an integer ranging from 1 to 3; each $R^8$ is independently from each other selected from the group consisting of alkyl, aryl and hydrogen, preferably it is selected from $C_1$- to $C_6$-alkyl, phenyl and hydrogen, it is more preferably selected from hydrogen, methyl, ethyl, propyl, even more preferably it is selected from hydrogen and methyl;
E is selected from the group defined above; and A is a diurea compound according to formula (A1).

In a preferred embodiment of the present invention, the bisurea derivative is represented by formula (IIb) and contains a second terminating group (TG2) which is a diurea compound A and does not contain a first terminating group thereby having only diurea compounds as end-groups of the bisurea derivative.

The diurea compounds according to formula (A1) contain two urea moieties which are linked by a bridging moiety Z which preferably does not contain any nitrogen moieties such as amines or ammonium. It was found by the inventors that bisurea derivatives according to formula (I) containing such bridging moieties have a dual-functionality and act as carrier-suppressors and levellers in aqueous copper plating baths (Application Examples 1 to 5).

The linkages between diurea compounds A according to formula (A1) and divalent residue D occur via the nitrogen atoms present in moieties $X^1$ and $X^2$ whereby for example quaternary ammonium groups are formed linking the divalent residue D with the tertiary amino groups of the diurea compounds A.

If terminal tertiary amino groups are present in the at least one bisurea additive, they can be converted into the respective quaternary group in accordance with the desired properties by using an organic monohalide or organic monopseudohalides such as benzyl chloride, alkyl chloride, such as 1-chlorohexane or allyl chloride or their corresponding bromides and mesylates, or by using an appropriate mineral acid, such as hydrochloric acid, hydrobromic acid, hydroiodic acid or sulphuric acid.

The at least one bisurea derivative preferably has a weight average molecular mass Mw of 500 to 50000 Da, more preferably of 1000 to 20000 Da.

The at least one bisurea derivative preferably does not contain any organically bound halogen, such as a covalent C—Cl moiety.

In so far as the term "alkyl" is used in this description and in the claims, it refers to a hydrocarbon radical with the general chemical formula $C_yH_{2y+1}$, y being an integer from 1 to about 50. Alkyl residues according to the present invention can be linear and/or branched. In one embodiment, they may unsaturated and comprise double or triple bonds between neighbouring carbon atoms. If the alkyl residues are unsaturated the corresponding general chemical formula has to be adjusted accordingly. $C_1$-$C_8$-alkyl for example includes, among others, methyl, ethyl, n-propyl, iso-propyl, n-butyl, iso-butyl, tert-butyl, n-pentyl, iso-pentyl, sec-pentyl, tert-pentyl, neo-pentyl, hexyl, heptyl and octyl. Alkyl can be substituted by replacing an H-atom in each case by a functional group, for example hydroxy, halides such as fluorine, chlorine, bromine, iodine, carbonyl, carboxyl, carboxylic acid esters and so forth.

In so far as the term "alkylene" is used in this description and in the claims, it refers to a hydrocarbon diradical with the general chemical formula $C_zH_{2z}$, z being an integer from 1 to about 50. Alkylene residues according to the present invention can be linear and/or branched. In one embodiment they can be unsaturated. If the alkylene residues are unsaturated the corresponding general chemical formula has to be adjusted accordingly. $C_1$-$C_4$-alkylene for example includes, among others, methane-1,1-diyl, ethane-1,2-diyl, ethane-1,1-diyl, propane-1,3-diyl, propane-1,2-diyl, propane-1,1-diyl, butane-1,4-diyl, butane-1,3-diyl, butane-1,2-diyl, butane-1,1-diyl, butane-2,3-diyl. Alkylene can be substituted by replacing an H-atom in each case by a functional group, for example hydroxy, halides such as fluorine, chlorine, bromine, iodine, carbonyl, carboxyl, carboxylic acid esters and so forth.

In so far as the term "aryl" is used in this description and in the claims, it refers to ring-shaped aromatic hydrocarbon radical, for example phenyl or naphtyl, where individual ring carbon atoms can be replaced by N, O and/or S, for example benzothiazolyl. Furthermore, aryl can be substituted by replacing an H-atom in each case by a functional group, for example amino, hydroxy, halides such as fluorine, chlorine, bromine, iodine, carbonyl, carboxyl, carboxylic acid esters and so forth.

In so far as the term "aralkyl" is used in this description and in the claims, it refers to a hydrocarbon radical consisting of an alkyl and an aryl radical. The bonding sites in some chemical formulae are emphasised by a wavy line ("〜").

In so far as the term "polyoxyalkylene" is used in this description and in the claims, it refers to radicals which comprise polymers of alkylene oxides, such as ethylene oxide and/or propylene oxide. Polyoxyalkylene residues are known in the art and also referred to as polyethers. The polyoxyalkylene residues may comprise further alkylene oxides or styrene oxide. These further alkylene oxides may be selected from the group consisting of 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 2,3-hexene oxide, 3,4-hexene oxide, 2-methyl-1,2-pentene oxide, 2-ethyl-1,2-butene oxide, 3-methyl-1,2-pentene oxide, decene oxide, 4-methyl-1,2-pentene oxide or styrene oxide. When two or more different alkylene oxides or one or more alkylene oxides and styrene oxide are used, the polyoxyalkylene groups formed may be random copolymers, alternating copolymers, gradient copolymers or block copolymers. Preferably, the (average) molecular weight $M_w$ of the polyoxyalkylene residue according to the invention is in the range from 100 to 2000. The polyoxyalkylene residues may contain further contain terminating functional groups such as hydroxyl, alkyl, aryl, sulphate, phosphoryl, carboxylic acid esters such as acetyl which are bound to the otherwise terminal hydroxyl group.

The bisurea derivative is obtainable by a reaction of one or more diurea compounds according to formula (A1) and one or more monomers B selected from the group consisting of B1, B2, B3, B4 and B5, each of which are represented by the following formulae

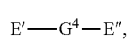  (B1)

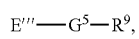  (B2)

  (B3)

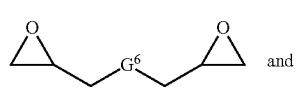  (B4)

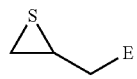  (B5)

wherein
- each $G^4$, each $G^5$ and each $G^6$ are divalent residues independently from each other represented by the following formula —$(CH_2)_p$—$[CH(R^{10})$—$CH_2$—$O]_q$—$(CH_2)_r$— wherein p is an integer ranging from 0 to 3; each q is an integer independently from each other ranging from 1 to 100, q preferably ranges from 1 to 20; each r is an integer independently from each other ranging from 1 to 3; each $R^{10}$ is independently from each other selected from the group consisting of alkyl, aryl and hydrogen, preferably it is selected from $C_1$- to $C_6$-alkyl, phenyl and hydrogen, it is more preferably selected from hydrogen, methyl, ethyl, propyl, even more preferably it is selected from hydrogen and methyl;
- E', E" and E''' are each leaving groups independently from each other selected from triflate, nonaflate, alkylsulphonates such as methanesulphonate, arylsulphonates such as tosylate, phenylsulphonate, p-nitrobenzosulphonate, p-bromobenzosulphonate and halogenides such as chloride, bromide and iodide; and
- each $R^9$ is a monovalent residue independently from each other selected from the group consisting of $C_1$- to $C_8$-alkyl, aralkyl, aryl, preferably $R^9$ is selected from methyl, ethyl, propyl and allyl.

Particularly suitable examples for B1 are bis(2-chloroethyl)ether (CAS-No. 111-44-4), 1,2-bis-(2-chloroethoxy)ethane (CAS-No. 112-26-5), bis[2-(2-chloroethoxy)ethyl]ether (CAS-No. 638-56-2), 1,14-dichloro-3,6,9,12-tetraoxatetradecane (CAS-No. 5197-65-9), 1,17-dichloro-3,6,9,12,15-pentaoxaheptadecane (CAS-No. 52559-90-7), 1,20-dichloro-3,6,9,12,15,18-hexaoxaeicosane (CAS-No. 56930-39-3), 1,23-dichloro-3,6,9,12,15,18,21-heptaoxatricosane (CAS-No. 54797-77-2), 1,13-dichloro-7-methyl-3,6,8,11-tetraoxatridecane (CAS-No. 41489-83-2), 1,15-dichloro-7,9-dimethyl-3,6,10,13-tetraoxapentadecane (CAS-No. 142802-65-1), 1,14-dichloro-4,11-dimethyl-3,6,9,12-Tetraoxatetradecane (CAS-No. 88986-54-3), 2-(2-chloroethoxy)-1-[2-[2-(2-chloroethoxy)propoxy]propoxy]propane (CAS-No. 88986-53-2), 2,3-bis[2-(2-chloroethoxy)ethoxy]butane (CAS-No. 139426-29-2), higher homologues thereof and the respective derivatives wherein one or more of chlorine atoms are replaced by one or more of bromine, iodine, triflate, nonaflate, arylsulphonate, alkylsulphonate.

Particularly suitable examples for B2 are alkylhalides such as chloropropane, chlorobutane, chloropentane, chlorohexane, alkanolhalides such as chloroethanol and alkylpseudohalides such as those derivatives of the aforementioned alkylhalides wherein the chlorine atoms are replaced by triflate, nonaflate, arylsulphonate, alkylsulphonate or mixtures of the aforementioned.

Particularly suitable examples for B3 are epichlorohydrin and epibromohydrin, Oxiran-2-ylmethyl methanesulphonate, Oxiran-2-ylmethyl benzenesulphonate, Oxiran-2-ylmethyl and 4-methylbenzenesulphonate. Particularly suitable examples for B5 are the respective sulphur containing derivatives of B3 wherein the oxygen atom has been replaced by a sulphur atom.

Particularly suitable examples for B4 are polyethylene diglycidylethers, polypropylene diglycidylethers and copolymers of ethylene oxide and propylene oxide with two glycidyl capping groups having an average molecular $M_n$ weight of 100 to 6000. Typical examples are those polymers having one of the following CAS-Nos. 39443-66-8 (400 Da), 26142-30-3 ($M_n$ 640 Da), 72207-80-8 ($M_n$ 500 to 6000 Da).

The reaction to obtain the bisurea derivative is preferably carried out in one or more protic or aprotic and polar solvent. Suitable solvents are water, glycols, acetonitrile and alcohols or mixtures thereof, water being preferred. The reaction is preferably carried out at a temperature ranging from 30 to 100° C., more preferably between 40 and 90° C. The reaction is preferably run until the starting materials are completely consumed or alternatively and preferably for 2 to 120 hours, more preferably for 4 to 96 hours which is normally sufficient for complete conversion of the starting materials.

In a preferred embodiment of the invention, the molar ratio $$\frac{n_A}{n_B}$$

of the amount of substance $n_A$ of diurea compound A (which means in this connection the overall amount of substance of all diurea compounds A if more than one is used) to the amount of substance $n_B$ of monomer B (which means in this connection the overall amount of substance of all monomers B if more than one is used) which is employed for the preparation of the bisurea derivative(s) ranges from 1:1 to 1.5:1, more preferably it ranges from 1.1:1 to 1.4:1.

The bisurea derivatives can be purified if necessary by any means known to those skilled in the art. These methods include precipitation (of products or of undesired impurities), chromatography, distillation, extraction, flotation or a combination of any of the aforementioned. The purification method to be used depends on the physical properties of the respective compounds present in the reaction mixture and has to be chosen for each individual case. In a preferred embodiment of the present invention, the purification comprises at least one of the following methods selected from the group consisting of extraction, chromatographic and precipitation. Alternatively, the bisurea derivatives can be used without further purification.

In another embodiment of the present invention, halide ions serving as the counter ions of the positively charged bisurea derivatives according to formula (I) are replaced after preparation of the polymer by anions such as methane sulfonate, hydroxide, sulfate, hydrogensulfate, carbonate, hydrogencarbonate, alkylsulfonate such as methane sulfonate, alkarylsulfonate, arylsulfonate, alkylcarboxylate, alkarylcarboxylate, arylcarboxylate, phosphate, hydrogenphosphate, dihydrogenphosphate, and phosphonate. The halide ions can be for example replaced by ion exchange over a suitable ion exchange resin. The most suitable ion exchange resins are basic ion exchange resins such as Amberlyst® A21. Halide ions can then be replaced by adding an inorganic acid and/or an organic acid containing the desired anions to the ion exchange resin. The enrichment of halide ions in the aqueous copper plating bath during use can be avoided if the bisurea derivatives contain anions other than halide ions.

One or more bisurea derivatives are used in aqueous copper plating bath according to the invention, more preferably in aqueous acidic copper electroplating baths.

The aqueous copper plating bath comprises at least one source of copper ions and at least one acid and is characterised in that it further comprises at least one bisurea derivative and wherein the aqueous copper plating bath is free of (intentionally added) zinc ions. The aqueous copper plating bath according to the invention is free of (intentionally added) zinc ions. Co-deposition of zinc and copper reduces the electrical conductivity of the formed deposit significantly compared to pure copper rendering such co-deposit of zinc and copper unsuitable for the use in the electronics industry. Since already small amounts of zinc in such a co-deposit of zinc and copper have above-described detrimental effect, it is preferred that the concentration of zinc ions in the aqueous copper plating bath according to the invention is 1 g/l or below, more preferably 0.1 g/l or below, even more preferably 0.01 g/l or below or most preferably the aqueous copper plating bath according to the invention is substantially free of zinc ions. Moreover, zinc exhibits a higher diffusivity in silicon or germanium than copper, hence, the incorporation of zinc might lead to unwanted electromigration effects.

If only one source of reducible metal ions is a source of copper ions in the aqueous copper plating bath according to the invention and pure copper will be deposited when using the aqueous copper plating bath. If more than one source of reducible metal ions is present therein an alloy will be deposited. At least one source of metal ions is a source of copper ions. More preferably, 99 weight percent or more of the reducible metal ions are copper ions.

Optionally, the aqueous copper plating bath comprises at least one further source of reducible metal ions. Reducible metal ions are understood in the context of the present invention as those metal ions which can be co-deposited with copper to form a copper alloy (under the given conditions). In the context of the present invention, these further reducible metal ions are preferably selected from the group consisting of gold ions, tin ions, silver ions, and palladium ions, more preferably selected from gold ions and silver ions. Suitable sources of said ions are water-soluble salts and/or water-soluble complexes of said metals. Typically, the mass ratio of further reducible metal ions to copper ions ranges from 1/1 to 0/1. Preferably, the mass ratio of further reducible metal ions to copper ions ranges from 0.5/1 to 0/1. More preferably, the mass ratio of further reducible metal ions to copper ions ranges from 0.1/1 to 0/1. Even more preferably, the mass ratio of further reducible metal ions to copper ions ranges from 0.01/1 to 0/1 (i.e. 99 weight percent or more of the reducible metal ions are copper ions). Yet even more preferably, the mass ratio of further reducible metal ions to copper ions ranges from 0.001/1 to 0/1. Most preferably, the aqueous copper plating bath according to the invention is free of such further reducible metal ions (and sources therefor) and thus contains only copper ions as reducible metal ions (disregarding traces of impurities commonly present in technical raw materials and above-mentioned redox couple).

Above-outlined preferences are due to the known fact that the deposition from any electrolytic copper plating bath may be hampered by the presence of other reducible metal ions besides copper. A copper bath containing also arsenic and/or antimony is exemplarily known to produce brittle and rough copper deposits and thus it is preferred that the aqueous copper plating bath is free from (intentionally added) arsenic and/or antimony ions. Nickel as further metal ion source is known not to be co-deposited along with copper from an plating bath in an electrolytic process, but it reduces the conductivity of such a bath and thus makes the electrolytic deposition then less efficient (cf. page 75 of "Modern Electroplating", 4th Edition, 2000, edited by M. Schlesinger, M. Paunovi, John Wiley & Sons, Inc., New York). Therefore, it is preferred that the aqueous copper plating bath according to the invention is free from (intentionally added) further reducible metal ions including ions of nickel, cobalt, zinc, arsenic, antimony, bismuth, lead, tungsten, molybdenum, rhenium, ruthenium, rhodium, osmium, iridium, platinum, mercury. Non-reducible metal ions include inter alia alkaline and earth alkaline metal ions (and above-described iron redox couple) which cannot be reduced under the conditions typically applied.

It is particularly preferred that the aqueous copper plating bath is suitable to form pure copper deposits and thus is free of (intentionally added) sources of ions of nickel, cobalt, zinc, silver, gold, arsenic, antimony, bismuth, tin, lead, tungsten, molybdenum, rhenium, ruthenium, rhodium, palladium, osmium, iridium, platinum, and mercury. More preferably, the aqueous copper plating bath according to the invention contains less than 1 g/l of the above named reducible metal ions, even more preferably less than 0.1 g/l of the above named reducible metal ions, yet even more preferably less than 0.01 g/l of the above named reducible metal ions, most preferably it is substantially free of such reducible metal ions listed above.

The concentration of the at least one bisurea derivative in the aqueous copper plating bath preferably ranges from 0.1 mg/l to 1000 mg/l, more preferably from 1 mg/l to 600 mg/l and most preferably from 10 mg/l to 400 mg/l. If more than one bisurea derivative is used, the overall concentration of all bisurea derivatives used is preferably in above-defined ranges.

The aqueous copper plating bath according to the invention is an aqueous solution. The term "aqueous solution" means that the prevailing liquid medium, which is the solvent in the solution, is water. Further liquids, that are miscible with water, as for example alcohols and other polar organic liquids may be added.

The aqueous copper plating bath according to the invention may be prepared by dissolving all components in aqueous liquid medium, preferably in water.

The aqueous copper plating bath contains at least one source of copper ions which is preferably selected from the group consisting of copper sulphate and copper alkyl sulphonates such as copper methane sulphonate. Further copper ion sources can be copper oxide or copper carbonate. The copper ion concentration in the aqueous copper plating bath preferably ranges from 10 g/L to 70 g/L.

The aqueous copper plating bath further contains at least one acid which is preferably selected from the group consisting of sulphuric acid, fluoroboric acid, phosphoric acid and methane sulphonic acid and is preferably added in a concentration of 10 g/L to 400 g/L, more preferably from 20 g/L to 250 g/L.

The aqueous copper plating bath composition preferably has a pH value of ≤2, more preferably of ≤1.

The aqueous copper plating bath preferably further contains at least one accelerator-brightener additive which is selected from the group consisting of organic thiol-, sulphide-, disulphide- and polysulphide-compounds. Preferred accelerator-brightener additives are selected from the group consisting of 3-(benzthiazolyl-2-thio)-propylsulphonic-acid, 3-mercaptopropan-1-sulphonic acid, ethylendithiodipropyl-sulphonic-acid, bis-(p-sulphophenyl)-disulphide, bis-(ω-sulphobutyl)-disulphide, bis-(ω-sulphohydroxypropyl)-disulphide, bis-(ω-sulphopropyl)-disulphide, bis-(ω-sulphopropyl)-sulphide, methyl-(ω-sulphopropyl)-disulphide, methyl-(ω-sulfopropyl)-trisulphide, O-ethyl-dithiocarbonic-acid-S-(ω-sulphopropyl)-ester, thioglycol-acid, thiophosphoric-acid-O-ethyl-bis-(ω-sulphopropyl)-ester, 3-N,N-dimethylaminodithiocarbamoyl-1-propanesulphonic acid, 3,3'-thiobis(1-propanesulphonic acid), thiophosphoric-acid-tris-(ω-sulphopropyl)-ester and their corresponding salts. The concentration of all accelerator-brightener additives optionally present in the aqueous copper plating bath preferably ranges from 0.01 mg/l to 100 mg/l, more preferably from 0.05 mg/l to 10 mg/l.

The aqueous copper plating bath optionally contains in addition to the bisurea derivative at least one further carrier-suppressor additive which is preferably selected from the group consisting of polyvinylalcohol, carboxymethylcellulose, polyethyleneglycol, polypropyleneglycol, stearic acid polyglycolester, alkoxylated naphthols, oleic acid polyglycolester, stearylalcoholpolyglycolether, nonylphenolpolyglycolether, octanolpolyalkyleneglycolether, octanediol-bis-(polyalkyleneglycolether), poly(ethyleneglycol-ran-propyleneglycol), poly(ethylenglycol)-block-poly(propylenglycol)-block-poly(ethylenglycol), and poly(propyleneglycol)-block-poly(ethylenglycol)-block-poly(propylenglycol). More preferably, the optional carrier-suppressor additive is selected from the group consisting of polyethyleneglycol, polypropyleneglycol, poly(ethylenegly-col-ran-propyleneglycol), poly(ethylenglycol)-block-poly(propylenglycol)-block-poly(ethylenglycol), and poly(propylenglycol)-block-poly(ethylenglycol)-block-poly(propylenglycol). The concentration of said optional carrier-suppressor additive preferably ranges from 0.005 g/l to 20 g/l, more preferably from 0.01 g/l to 5 g/l. Carrier-suppressors allow for smoother, more homogeneous copper surfaces with fewer voids to be obtained. However, such optional carrier-suppressor is not required as the bisurea derivative itself acts as carrier-suppressor.

Optionally, the aqueous copper plating bath contains at least one leveller additive selected from the group consisting of nitrogen containing levellers such as polyethyleneimine, alkoxylated polyethyleneimine, alkoxylated lactams and polymers thereof, diethylenetriamine and hexamethylenete-tramine, dyes such as Janus Green B, Bismarck Brown Y and Acid Violet 7, sulphur containing amino acids such as cysteine, phenazinium salts and derivatives thereof. Further nitrogen containing levellers can be polyethylenimine bearing peptides, polyethylenimine bearing amino acids, polyvinylalcohol bearing peptides, polyvinylalcohol bearing amino acids, polyalkyleneglycol bearing peptides, polyalkyleneglycol bearing amino acids, aminoalkylene bearing pyrroles and aminoalkylene bearing pyridines. Suitable ureyl polymers have been disclosed in EP 2 735 627 A1, said polyalkyleneglycol bearing amino acids and peptides are published in EP 2 113 587 B9 and EP 2 537 962 A1 teaches suitable aminoalkylenee bearing pyrroles and pyridines. The optional further leveller additive is preferably one or more of nitrogen containing levellers. Said optional leveller additive is added to the aqueous copper plating bath in amounts of 0.1 mg/l to 100 mg/l. Such leveller additives are known to improve the process stability. However, such optional carrier-suppressor is not required as the bisurea derivative itself acts as leveller.

The aqueous copper plating bath optionally further contains at least one source of halide ions, preferably chloride ions in a quantity of 20 mg/l to 200 mg/l, more preferably from 30 mg/l to 60 mg/l. Suitable sources for halide ions are for example hydrochloric acid or alkali halides such as sodium chloride.

Optionally, the aqueous copper plating bath may contain at least one wetting agent. These wetting agents are also referred to as surfactants in the art. The at least one wetting agent may be selected from the group of non-ionic, cationic and/or anionic surfactants and is used in concentration from 0.01 to 5 wt.-%.

In one embodiment of the present invention, a redox couple, such as $Fe^{2+/3+}$ ions is added to the preferred aqueous copper plating bath. Such a redox couple is particularly useful, if reverse pulse plating is used in combination with inert anodes for copper deposition. Suitable processes for copper plating using a redox couple in combination with reverse pulse plating and inert anodes are for example disclosed in U.S. Pat. Nos. 5,976,341 and 6,099,711. The aqueous copper plating bath is particularly suitable for electrolytic deposition of copper.

A method for deposition of copper or copper alloy onto a substrate comprising the steps
(i) providing the substrate,
(ii) contacting the substrate with the aqueous copper plating bath according to the invention, and
(iii) applying an electrical current between the substrate and at least one anode,
and thereby depositing copper or copper alloy on at least a portion of the surface of a substrate.

More preferably, pure copper (i.e. in the context of the present invention copper having a purity of 95 wt-% or more, of 98 wt.-% or more, even more preferably of 99 wt.-% or more) is deposited. The steps are carried out in the given order.

The substrate is preferably selected from the group consisting of printed circuit boards, IC substrates, circuit carriers, interconnect devices, semiconducting wafers and glass substrates. Preferred are substrates of the afore-mentioned group which have recessed structures such as trenches, blind micro vias, through silicon vias and through glass vias. Metal or metal alloy, preferably copper or copper alloys, are then deposited into these recessed structures. The metal or metal alloy plating bath according to the invention is operated from 10 to 100° C. for any time sufficient to deposit the desired deposit thickness. The preferred aqueous copper plating bath is preferably operated in the method according to the present invention in a temperature range of 15° C. to 50° C., more preferably in a temperature range of 20° C. to 40° C. by applying an electrical current to the substrate and at least one anode. Preferably, a cathodic current density range of 0.05 A/dm$^2$ to 12 A/dm$^2$, more preferably 0.1 A/dm$^2$ to 7 A/dm$^2$ is applied.

The substrate is contacted with the aqueous copper plating bath for any time length necessary to deposit the desired amount of copper. This time length preferably ranges from 1 second to 6 hours, more preferably for 5 seconds to 120 minutes, even more preferably for 30 seconds to 75 minutes.

The substrate and the aqueous copper plating bath can be contacted by any means known in the art. This includes inter alia immersion of the substrate into the bath or the use of other plating equipment. The aqueous copper plating bath according to the present invention can be used for DC plating and reverse pulse plating. Both inert and soluble anodes can be utilised when depositing metal or metal alloy, preferably copper or copper alloy, from the plating bath according to the present invention.

The aqueous copper plating bath can be either used in conventional vertical or horizontal plating equipment. The substrate or at least a portion of its surface may be contacted with aqueous copper plating bath according to the invention by means of spraying, wiping, dipping, immersing or by other suitable means. Thereby, a copper or copper alloy layer is obtained on at least a portion of the surface of the substrate.

It is preferential to agitate the aqueous copper plating bath during the plating process, i.e. the deposition of metal or metal alloy. Agitation may be accomplished for example by mechanical movement of the aqueous copper plating bath like shaking, stirring or continuously pumping of the liquids or by ultrasonic treatment, elevated temperatures or gas feeds (such as purging the electroless plating bath with air or an inert gas such as argon or nitrogen).

The process according to the invention may comprise further cleaning, etching, reducing, rinsing and/or drying steps all of which are known in the art.

It is an advantage of the present invention that the bisurea derivative may be used in the copper alloy plating bath without further leveller and/or carrier-suppressor as the bisurea derivative is dual-functional and acts as leveller and carrier-suppressor (Application Examples 1 to 5).

It is another advantage of the present invention that the aqueous copper plating bath allows for uniformal filling of recessed structures and that the deposits are free of voids and dimples. Uniformal filling is to be understood in the context of the present invention that different recessed structures having different aspect ratios such as trenches which generally have an aspect ratio of <1 and vias generally which have an aspect ratio of >1 can be filled in one step resulting in similar layer distribution in these different recessed structures having different aspect ratios.

The invention will now be illustrated by reference to the following non-limiting examples.

EXAMPLES $^1$H-NMR spectra were recorded at 250 MHz with a spectrum offset of 4300 Hz, a sweep width of 9542 Hz at 25° C. (Varian, NMR System 250). The solvent used was D$_2$O unless stated otherwise.

The weight average molecular mass M$_w$ of the bisurea derivatives was determined by gel permeation chromatography (GPC) using a GPC apparatus from WGE-Dr. Bures equipped with a molecular weight analyzer BI-MwA from Brookhaven, a TSK Oligo +3000 column, and Pullulan and PEG standards with M$_w$=400 to 22000 g/mol. The solvent used was Millipore water with 0.5% acetic acid and 0.1 M Na$_2$SO$_4$.

Preparation examples 1 to 4 relate to the synthesis of by diurea compounds according to formula (A1), while the other preparation examples disclose methods for the synthesis of the bisurea derivatives. Application examples 1 to 5 relate to the use of one bisurea derivatives as carrier suppressor and leveller in an aqueous copper plating bath.

Preparation of 1,1'-(5,8,11,14,17,20,23-heptamethyl-4,7,10,13,16,19,22,25-octaoxaoctacosane-2,27-diyl)-bis-(3-(3-dimethylamino)propyl)urea (Preparation Example 1)

A 50 mL round bottom flask with reflux condenser was charged with 6.47 g (44.50 mmol) 1-(3-dimethylaminopropyl)urea and 12.0 g (22.47 mmol) 5,8,11,14,17,20,23-Heptamethyl-4,7,10,13,16,19,22,25-octaoxaoctacosan-2,27-diamine. The reaction mixture was stirred and heated to 170° C. within 20 minutes. The ammonia formation which started at 121° C. ceased after 24 hours. Then, the reaction mixture was cooled to 100° C. and the reflux condenser was substituted for a distillation bridge. The volatile compounds in the reaction mixture were removed under reduced pressure and increased temperature (final temperature 175° C., final pressure 10 mbar) to yield 17.41 g (98% yield) of the desired product as dark brown viscous liquid.

$^1$H-NMR (D$_2$O; 250 MHz): δ 1.17 (m, 43H); 1.68 (q, 6H); 2.23 (s; 16H); 2.39 (t; 6H); 3.12 (t, 6H); 3.83-3.51 (m; 45H).

Preparation of 1,1'-(5,8,11,14,17-pentamethyl-4,7,10,13,16,19-hexaoxadocosane-2,21-diyl)bis(3-(3-dimethylamino)propyl)urea (Preparation Example 2)

Following preparation example 1, 8.25 g (56.80 mmol) 1-(3-dimethylaminopropyl)urea and 12.0 g (28.40 mmol) 5,8,11,14,17-Pentamethyl-4,7,10,13,16,19-hexaoxadocosan-2,21-diamine were converted into above captioned urea derivative. 18.82 g (98% yield) of the desired product were obtained as dark brown viscous liquid.

$^1$H-NMR (D$_2$O; 250 MHz): δ 1.17 (m, 30H); 1.66 (q, 6H); 2.22 (s; 16H); 2.38 (t; 6H); 3.12 (t; 6H) 3.82-3.51 (m; 36H).

Preparation of 1,1'-(5,8,11,14-tetramethyl-4,7,10,13,16-pentaoxanonadecan-2,18-diyl)bis(3-(3-dimethylamino)propyl)urea (Preparation Example 3)

Following preparation example 1, 9.56 g (65.80 mmol) 1-(3-dimethylaminopropyl)urea and 12.0 g (32.90 mmol) 5,8,11,14-Tetramethyl-4,7,10,13,16-pentaoxanonadecan-2,18-diamine were converted into above captioned urea derivative. 19.46 g (95% yield) of the desired product were obtained as dark brown viscous liquid.

$^1$H-NMR (D$_2$O; 250 MHz): δ 1.17 (m, 27H); 1.65 (q, 6H); 2.21 (s; 17H); 2.38 (t; 6H); 3.12 (t; 6H) 3.83-3.51 (m; 29H).

Preparation of 1,1'-(((oxybis(ethan-2,1-diyl))bis(oxy))bis(propyn-3,1-diyl))bis(3-(3-(dimethylamino)propyl)urea (Preparation Example 4)

Following preparation example 1, 25.0 g (172.0 mmol) 1-(3-dimethylaminopropyl)urea and 19.55 g (86.0 mmol) 4,7,10-Trioxa-1,13-tridecandiamine (CAS-No. 4246-51-9) were converted into above captioned urea derivative although the reaction mixture was heated to 150° C. to 170°

C. prior to the distillation. 41.0 g (98% yield) of the desired product were obtained as beige waxy solid.

$^1$H-NMR (D$_2$O; 250 MHz): δ 1.38-1.63 (m, 8H); 2.07-2.2 (m, 16H); 2.96 (m; 8H); 3.33-3.47 (m; 19H).

Preparation Example 5

A 100 mL glass reactor equipped with the magnetic stirring bar and reflux condenser was charged with 9.54 g (15.36 mmol) 1,1'-(5,8,11,14-tetramethyl-4,7,10,13,16-pentaoxanonadecane-2,18-diyl)-bis(3-(3-dimethylamino)propyl) (product of preparation example 3) urea in 35.21 mL water at 22° C. before heating the reaction mixture to 80° C. 2.20 g (11.52 mmol) 1,2-bis(2-chloroethoxy)ethane (CAS-No. 112-26-5) were added over two hours to the above mentioned reaction mixture at 80° C. The yellow emulsion which formed thereupon was stirred for further 48 hours yielding a clear yellowish solution. The reaction mixture was cooled to 20° C. and diluted with water in an amount sufficient to give a 25 weight percent solution. 38.80 g of a yellow product solution were obtained (M$_w$=3400 Da, M$_n$=1800 Da; polydispersity: 1.8).

Preparation Example 6

A 100 mL glass reactor equipped with the magnetic stirring bar and reflux condenser was charged with 7.50 g (15.73 mmol) 1,1'-(((oxybis(ethan-2,1-diyl))bis(oxy))bis(propyn-1,3-diyl))bis(3-(dimethylamino)propyl)urea) (product of preparation example 4) in 29.05 mL water at 22° C. before heating the reaction mixture to 80° C. 2.253 g (11.52 mmol) 1,2-bis-(2-chloroethoxy)ethane (CAS-No. 112-26-5) were added over two hours to the above mentioned reaction mixture at 80° C. The yellow emulsion which formed thereupon was stirred for further 48 hours yielding a clear yellowish solution. The reaction mixture was cooled to 20° C. and diluted with water in an amount sufficient to give a 25 weight percent solution. 38.80 g of a yellow product solution were obtained (M$_w$=6600 Da, M$_n$=3500 Da; polydispersity: 1.8).

Preparation Example 7

A 100 mL glass reactor equipped with the magnetic stirring bar and reflux condenser was charged with 7.50 g (15.73 mmol) 1,1'-(((oxybis(ethan-2,1-diyl))bis(oxy))bis(propyn-3,1-diyl))bis(3-(dimethylamino)propyl)urea) (product of preparation example 4) in 30.65 mL water at 22° C. before heating the reaction mixture to 80° C. 2.81 g (11.80 mmol) Bis[2-(2-chloroethoxy)ethyl]ether (CAS No. 638-56-2) were added over two hours to the above mentioned reaction mixture at 80° C. The yellow emulsion which formed thereupon was stirred for further 48 hours yielding a clear yellowish solution. The reaction mixture was cooled to 20° C. and diluted with water in an amount sufficient to give a 25 weight percent solution. 40.96 g of a yellow product solution were obtained (M$_w$=7600 Da, M$_n$=3800 Da; polydispersity: 2.0).

Preparation Example 8

A 100 mL glass reactor equipped with the magnetic stirring bar and reflux condenser was charged with 9.15 g (13.47 mmol) 1,1'-(5,8,11,14,17-pentamethyl-4,7,10,13,16,19-hexaoxadocosan-2,21-diyl)-bis(3-(3-dimethylamino)propyl)urea (product of preparation example 2) in 33.23 mL water at 22° C. before heating the reaction mixture to 80° C. 1.93 g (10.11 mmol) 1,2-bis-(2-chloroethoxy)ethane (CAS-No. 112-26-5) were added over two hours to the above mentioned reaction mixture at 80° C. The yellow emulsion which formed thereupon was stirred for further 48 hours yielding a clear yellowish solution. The reaction mixture was cooled to 20° C. and diluted with water in an amount sufficient to give a 25 weight percent solution. 40.96 g of a yellow product solution were obtained (M$_w$=3800 Da, M$_n$=2000 Da; polydispersity: 1.8).

Preparation Example 9

A 100 mL glass reactor equipped with the magnetic stirring bar and reflux condenser was charged with 8.50 g (10.69 mmol) 1,1'-(5,8,11,14,17,20,23-heptamethyl-4,7,10,13,16,19,22,25-octaoxaoctacosan-2,27-diyl)-bis(3-(3-dimethylamino)propyl)urea (product of preparation example 1) in 30.10 mL water at 22° C. before heating the reaction mixture to 80° C. 1.91 g (8.02 mmol) Bis[2-(2-chloroethoxy)ethyl]ether (CAS No. 638-56-2) were added over two hours to the above mentioned reaction mixture at 80° C. The yellow emulsion which formed thereupon was stirred for further 48 hours yielding a clear yellowish solution. The reaction mixture was cooled to 20° C. and diluted with water in an amount sufficient to give a 25 weight percent solution. 41.64 g of a yellow product solution were obtained (M$_w$=2200 Da, M$_n$=1600 Da; polydispersity: 1.6).

Copper Deposition into BMVs':

Aqueous copper plating baths containing the bisurea derivative synthesized according to preparation examples described above were used for deposition of copper into recessed structures and then subjected to below described test method. The accelerator-brightener additive used throughout all examples was Cupracid® Brightener (product of Atotech Deutschland GmbH) which is a standard sulphur containing brightener.

A sufficient BMV filling with copper means that the copper deposit has no or almost no so-called dimple (depression of the copper surface at the point of the BMV). Hence, the copper surface of a sufficiently filled BMV is as even as possible.

An insufficient BMV filling is characterised by a concave structure of the copper deposit, i.e. by a dimple. Voids in a copper filled via are also not desired.

The cross sections of recessed structures filled with copper were investigated with an optical microscope after depositing a protection layer of nickel onto the copper deposit and applying conventional grinding and polishing methods. A copper filled BMV obtained in application example 1 is shown in FIG. 1.

The values for "dimple" were recorded with a chromatic sensor (Nanofocus μ-scan with sensor CRTS).

Methods for Application Examples 1 to 5 (Bisurea Derivatives as Leveller and Carrier-Suppressors)

Equipment: Gornall cell with 1.8 L volume, bath agitation with a pump, no air injection, soluble copper anodes.

An aqueous copper plating bath stock solution comprising 45 g/L Cu$^{2+}$ ions (added as copper sulfate), 50 g/L sulfuric acid, 45 mg/L Cl$^-$ ions and 0.5 mL/L of a solution containing an organic brightener additive was used. The bisurea derivative was added to the said stock solution.

A current density of 1 A/dm$^2$ was applied throughout all application examples. The thickness of copper plated onto the top surface of the substrate was in average 12 μm. The plating time was 57 min. The test panels were cleaned, microetched and rinsed prior to electroplating of copper.

The test panels used throughout the application examples comprised BMVs' (depth×diameter: 70×40 μm and 100×40 μm). The size of the test panels was 7.5×10 cm.

The results are listed in Table I.

TABLE I

Application Examples as leveller and carrier-suppressor (BMV filling capability).

| Application example | Bisurea derivatives | Bisurea derivative conc. [mg/L] | Dimple [μm] in 70 × 40 μm BMVs' | Dimple [μm] in 100 × 40 μm BMVs' |
|---|---|---|---|---|
| 1 | Preparation Ex. 9 | 25 | 0 | 0 |
| 2 | Preparation Ex. 9 | 50 | 0 | 0 |
| 3 | Preparation Ex. 9 | 100 | 0 | 0 |
| 4 | Preparation Ex. 9 | 200 | 0 | 0 |
| 5 | Preparation Ex. 9 | 400 | 0 | <5 μm |

Blind micro vias (BMV) having dimensions of 70×40 μm and 100×40 μm were filled with copper. The BMVs' were all evenly filled with copper and thus satisfied the industrial requirements which are dimples of below 5 μm. In all but one example there was even no dimple at all. It can be seen that already 25 mg/L of the bisurea derivative was sufficient for this purpose and no additional leveller or carrier-suppressor was required. The bisurea derivatives are thus dual-functional and act as leveller and/or as carrier-suppressor. Only one additive was thus necessary reducing the overall amount of chemical additives in the plating which is an environmental asset and decreases overall cost.

Application Examples 6 to 17 (Bisurea Derivatives as Leveller)

Above described stock solution was supplemented with 300 mg/L polyethylene glycol as carrier-suppressor and various bisurea derivatives as given in the subsequent table. BMVs were filled with copper following above-described method. The test panels used in this case comprised BMVs' (depth×diameter: 80×30 μm and 100×30 μm).

The results are summarized in the following Table II.

TABLE II

Application Examples as leveller (BMV filling capability).

| Application example | Bisurea derivatives | Bisurea derivative conc. [mg/l] | Dimple [μm] in 80 × 30 μm BMVs' | Dimple [μm] in 100 × 30 μm BMVs' |
|---|---|---|---|---|
| 6 | Preparation Example 5 | 5 | 1 | 6 |
| 7 | Preparation Example 5 | 30 | 0 | <5 |
| 8 | Preparation Example 6 | 1 | 0 | 0 |
| 9 | Preparation Example 6 | 3 | 2 | 0 |
| 10 | Preparation Example 6 | 5 | 0 | <5 |
| 11 | Preparation Example 6 | 10 | 0 | 5 |
| 12 | Preparation Example 7 | 5 | 0 | 5 |
| 13 | Preparation Example 7 | 20 | 0 | 3 |
| 14 | Preparation Example 8 | 1 | 4 | 10-15 |
| 15 | Preparation Example 8 | 3 | 4 | 10-15 |
| 16 | Preparation Example 8 | 10 | 0 | 5 |
| 17 | Preparation Example 8 | 30 | 0 | <5 |

Blind micro vias (BMV) having dimensions of 80×30 μm and 100×30 μm were filled with copper. The bisurea derivatives were used as levellers in these Application Examples. The dimples of the BMVs' were mostly sufficiently low to satisfy today's industrial requirements, i.e. below 5 μm. However, the bisurea derivative according to Preparation Example 5 required slightly higher concentrations in order to allow for small enough dimples for bigger BMVs'.

Other embodiments of the present invention will be apparent to those skilled in the art from a consideration of this specification or practice of the invention disclosed herein. It is intended that the specification and examples be considered as exemplary only, with the true scope of the invention being defined by the following claims only.

The invention claimed is:

1. An aqueous copper plating bath for electrolytic copper or copper alloy deposition comprising
   at least one source of copper ions;
   at least one acid; and
   at least one bisurea derivative comprising a bisurea building block according to formula (I)

(I)

wherein A represents a unit derived from a diurea compound of the following formula (A1)

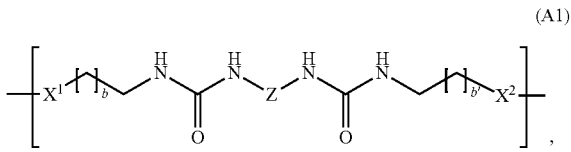

(A1)

wherein
X$^1$ and X$^2$ are divalent residues independently from each other selected from the following group consisting of

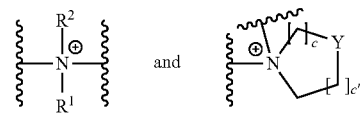

wherein $R^1$ and $R^2$ are monovalent residues each selected independently from the group consisting of hydrogen, alkyl and polyoxyalkylene;

Y is selected from $CH_2$, O and S;

c is an integer ranging from 1 to 6; c' is an integer ranging from 1 to 6;

b is an integer ranging from 1 to 5;

b' is an integer ranging from 1 to 5;

Z is a divalent bridging moiety which is selected from the group consisting of alkylene, arylene and alkylene oxide compound whereby said alkylene oxide compound is represented by the following formula —$(CH_2)_d$—$[CH(R^3)$—$CH_2$—$O]_e$—$(CH_2)_f$—$(CH(CH_3))_{f'}$—, wherein d is an integer ranging from 0 to 3;
e is an integer ranging from 1 to 100; and
f is an integer ranging from 1 to 3;
f' is 0 or 1;
each $R^3$ is independently from each other selected from the group consisting of alkyl, aryl and hydrogen;
a is an integer and ranges from 1 to 100; and
D is a divalent residue and is selected from the group consisting of
—$CH_2$—$CH(OH)$—$CH_2$—,
—$CH_2$—$CH(SH)$—$CH_2$—,—$(CH_2)_g$—$[CH(R^4)$—$CH_2$—$O]_h$—$(CH_2)_i$— and
—$CH_2$—$CH(OH)$—$(CH_2)_j$—$[CH(R^5)$—$CH_2$—$O]_k$—$(CH_2)_l$—$CH(OH)$—$CH_2$—
wherein g is an integer ranging from 0 to 4;
h is an integer ranging from 1 to 100;
i is an integer ranging from 1 to 4;
each $R^4$ is independently from each other selected from the group consisting of alkyl, aryl and hydrogen;
j is an integer ranging from 1 to 4;
k is an integer ranging from 1 to 100;
l is an integer ranging from 1 to 4;
each $R^5$ is independently from each other selected from the group consisting of alkyl, aryl and hydrogen
and if a is 2 or greater each A and each D are selected independently from each other
and wherein the aqueous copper plating bath is free of added zinc ions.

2. The aqueous copper plating bath according to claim 1 characterised in that the mass ratio of further reducible metal ions to copper ions ranges from 1/1 to 0/1.

3. The aqueous copper plating bath according to claim 2 characterised in that the further reducible metal ions are selected from the group consisting of gold ions, tin ions, silver ions, and palladium ions.

4. The aqueous copper plating bath according to claim 1 characterised in that the aqueous copper plating bath is free of further reducible metal ions.

5. The aqueous copper plating bath according to claim 1 characterised in that $X^1$ and $X^2$ are selected to be the same.

6. The aqueous copper plating bath according to claim 1 characterised in that b and b' are the same and range from 1 to 2.

7. The aqueous copper plating bath according to claim 1 characterised in that D is selected from the group consisting of
—$CH_2$—$CH(OH)$—$CH_2$—,
—$(CH_2)_g$—$[CH(R^4)$—$CH_2$—$O]_h$—$(CH_2)_i$— and
—$CH_2$—$CH(OH)$—$(CH_2)_j$—$[CH(R^5)$—$CH_2$—$O]_k$—$(CH_2)_l$—$CH(OH)$—$CH_2$—.

8. The aqueous copper plating bath according to claim 7 characterised in that D is —$(CH_2)_g$—$[CH(R^4)$—$CH_2$—$O]_h$—$(CH_2)_i$— and g is 0 and i is an integer ranging from 1 to 3.

9. The aqueous copper plating bath according to claim 1 characterised in that the alkylene, arylene or alkylene oxide compound forming Z are free of nitrogen atoms.

10. The aqueous copper plating bath according to claim 1 characterised in that each Z is selected to be an alkylene oxide compound represented by the formula —$(CH_2)_d$—$[CH(R^3)$—$CH_2$—$O]_e$—$(CH_2)_f$—$(CH(CH_3))_{f'}$— and d is 0 and e is an integer ranging from 1 to 10 and f' is 0.

11. The aqueous copper plating bath according to claim 1 characterised in that the at least one bisurea derivative contains one or two terminating groups and is represented by the following formulae (IIa) to (IIc)

$$TG1\text{—}[A\text{—}D]_a,\qquad\text{(IIa)}$$

$$[A\text{—}D]_a\text{—}TG2\quad\text{or}\qquad\text{(IIb)}$$

$$TG1\text{—}[A\text{—}D]_a\text{—}TG2\qquad\text{(IIc)}$$

wherein the first terminating group (TG1) bound to a unit derived from diurea compound in the bisurea building block according to formula (I) is selected from the group consisting of E-$G^1$-, $R^6$-$G^2$-,

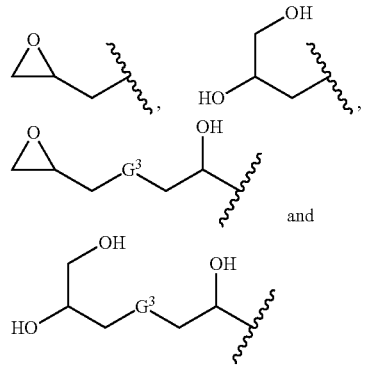

and wherein $G^1$, $G^2$ and $G^3$ are divalent residues represented by the following formula —$(CH_2)_m$—$[CH(R^7)$—$CH_2$—$O]_n$—$(CH_2)_o$— wherein m is an integer ranging from 0 to 3; n is an integer ranging from 1 to 100; o is an integer ranging from 1 to 3;

each $R^7$ is independently from each other selected from the group consisting of alkyl, aryl and hydrogen;

E is a monovalent residue and is selected from triflate, nonaflate, alkylsulphonates, arylsulphonates and halogenides; and $R^6$ is a monovalent residue selected from the group consisting of $C_1$- to $C_8$-alkyl, $C_1$- to $C_8$-alkenyl, aralkyl, aryl; and the second terminating group (TG2) bound to divalent residue D in the bisurea building block according to formula (I) is selected from the group consisting of hydroxyl group (—OH), diurea compound A, monovalent residue E, $C_1$- to $C_8$-alkyl, aralkyl, aryl,

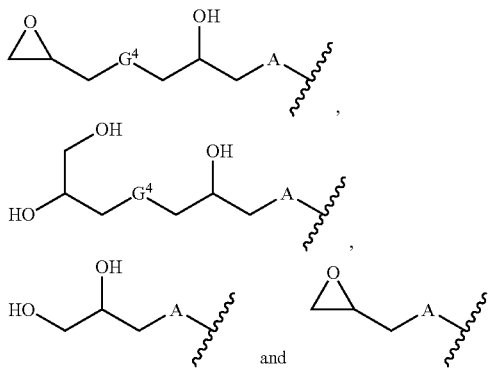

wherein $G^4$ is a divalent residue represented by the following formula $-(CH_2)_m-[CH(R^8)-CH_2-O]_n-(CH_2)_o-$ wherein m is an integer ranging from 0 to 3; n is an integer ranging from 1 to 100; o is an integer ranging from 1 to 3; each $R^8$ is independently from each other selected from the group consisting of alkyl, aryl and hydrogen;

E is a monovalent residue and is selected from triflate, nonaflate, alkylsulphonates, arylsulphonates and halogenides; and A is a diurea compound according to formula (A1).

12. The aqueous copper plating bath according to claim 1 characterised in that the at least one bisurea derivative has a weight average molecular mass $M_w$ of 500 to 50000 Da.

13. The aqueous copper plating bath according to claim 1 characterised in that the concentration of the at least one bisurea derivative in the aqueous copper plating bath ranges from 0.1 mg/l to 1000 mg/l.

14. A method for deposition of copper or copper alloy onto a substrate comprising the steps
 (i) providing the substrate,
 (ii) contacting the substrate with the aqueous copper plating bath according to claim 1, and
 (iii) applying an electrical current between the substrate and at least one anode,
and thereby depositing copper or copper alloy on at least a portion of a surface of the substrate.

15. The method of claim 14 characterised in that the substrate is selected from the group consisting of printed circuit boards, IC substrates, circuit carriers, interconnect devices, semiconducting wafers and glass substrates.

16. The method of claim 15 characterised in that the substrate has recessed structures selected from trenches, blind micro vias, through silicon vias and through glass vias.

17. The method of claim 14 characterised in that pure copper is deposited.

18. The aqueous copper plating bath according to claim 5 characterised in that D is selected from the group consisting of
 $-CH_2-CH(OH)-CH_2-$,
 $-(CH_2)_g-[CH(R^4)-CH_2-O]_h-(CH_2)_i-$ and
 $-CH_2-CH(OH)-(CH_2)_j-[CH(R^5)-CH_2-O]_k-(CH_2)_l-CH(OH)-CH_2-$.

19. The aqueous copper plating bath according to claim 6 characterised in that D is selected from the group consisting of
 $-CH_2-CH(OH)-CH_2-$,
 $-(CH_2)_g-[CH(R^4)-CH_2-O]_h-(CH_2)_i-$ and
 $-CH_2-CH(OH)-(CH_2)_j-[CH(R^5)-CH_2-O]_k-(CH_2)_l-CH(OH)-CH_2-$.

* * * * *